United States Patent [19]

Nowicki et al.

[11] Patent Number: 5,057,568
[45] Date of Patent: Oct. 15, 1991

[54] POLYURETHANE ADHESIVES

[75] Inventors: James Nowicki, Hopewell; Arthur Pruiksma, Chester, both of N.J.

[73] Assignee: National Starch and Chemical Investment Holding Corporation, Wilmington, Del.

[21] Appl. No.: 510,366

[22] Filed: Apr. 17, 1990

[51] Int. Cl.$^5$ ................................................ C08K 5/15
[52] U.S. Cl. ..................................... 524/361; 524/869; 528/26; 528/28; 528/52; 528/115; 428/425.1
[58] Field of Search ....................... 528/80, 85, 83, 81, 528/52, 115, 26, 28; 428/38, 40, 409, 425; 524/361, 869

[56] References Cited

U.S. PATENT DOCUMENTS

| | | | |
|---|---|---|---|
| 3,729,368 | 4/1973 | Ingham et al. | 161/119 |
| 3,779,794 | 12/1973 | DeSantis | 117/72 |
| 4,098,747 | 7/1978 | Bailey et al. | 524/361 |
| 4,250,274 | 2/1981 | Damico et al. | 525/127 |
| 4,272,581 | 6/1981 | Cooley et al. | 428/328 |
| 4,430,371 | 2/1984 | Boyes | 428/61 |
| 4,514,626 | 4/1985 | Schumacher | 428/425.6 |
| 4,555,561 | 11/1985 | Sugimori et al. | 528/26 |
| 4,725,662 | 2/1988 | Kuga et al. | 528/80 |

FOREIGN PATENT DOCUMENTS 0039162 4/1981 European Pat. Off. .

Primary Examiner—John Kight, III
Assistant Examiner—Duc Troung
Attorney, Agent, or Firm—Ellen T. Dec; Jane E. Gennaro; Edwin M. Szala

[57] ABSTRACT

A solvented polyurethane adhesive composition comprising 20 to 40% by weight of diphenylmethane diisocyanate, 0.5 to 4.0% by weight of a caprolactone triol, 40 to 75% by weight of a neopentyl adipate ester diol, 0 to 10% by weight of at least one polypropylene oxide diol, and a functionally effective amount of a catalyst therefor.

9 Claims, No Drawings

POLYURETHANE ADHESIVES

Laminates are commonly used substitutes for hard wood where durability, machineability, water resistance, cost and/or other factors dictate against the use of raw wood surfaces. Thus, laminates are formed into furniture, door or window frames and sills, kitchen cabinets, desk tops, display cases, picture frames and the like.

Depending on their intended end use, such laminates are generally formed from rigid substrates such as wood, board or rigid polyvinyl chloride, to which plastic substrates such as polyvinyl chloride sheets or Mylar film are bonded using an adhesive coating. In addition to the normal adhesive and cohesive requirements associated with these laminates, the nature and configuration of the base substrate often places additional stringent requirements on the adhesive composition per se. Thus, many of the laminates are formed by bonding the plastic substrate to a curved or irregularly shaped substrate, a factor which puts greater stress on the adhesive bond. Further, the base substrates utilized in the laminate production often contain irregularities such as gaps on their surfaces. It is therefore desirable to utilize an adhesive which will serve as a gap filler or will otherwise compensate for the irregularites of the surface in the final laminate construction. Moreover, the resulting laminate is often utilized in environments which are exposed to severe changes in temperature and consequently the adhesive must be able to accomodate such cyclical temperature fluctuations.

The present invention relates to specific solvented polyurethane adhesives particularly useful in the production of heat resistant laminates, the adhesives comprising 20 to 40% by weight of diphenylmethane diisocyanate (MDI), 0.5 to 4.0% by weight of a caprolactone triol, 40 to 75% by weight of a neopentyl adipate ester diol, 0 to 10% by weight of at least one polypropylene oxide diol, and a functionally effective amount of a catalyst therefor.

The resulting adhesives are characterized by superior wet or green strength as well as improved strength on aging, even when exposed to fluctuating temperature conditions. Moreover, the adhesive, when applied, serves as a gap filler to accomodate any irregularities in the substrate thereby producing a final laminate of excellent quality.

In accordance with an embodiment of the invention wherein the adhesive is to be used in the production of plastic (particularly polyvinyl chloride) to wood laminates, a preferred composition comprises 31 to 39% by weight diphenylmethane diisocyanate; 3.0 to 9.5% by weight of a polypropylene oxide diol having a molecular weight of about 1000; 3.0 to 9.5% by weight of a polypropylene oxide diol having a molecular weight of about 425; 44.5 to 54.5% by weight neopentyl adipate ester diol; 0.5 to 4% by weight of a caprolactone triol, and a functionally effective amount of a catalyst therefor.

In accordance with an alternate preferred embodiment of the invention wherein the adhesive is to be used in the lamination of plastic, particularly Mylar, to rigid plastic substrates such as polyvinyl chloride, the adhesive composition comprises 20 to 30% by weight of the diphenylmethane diisocyanate, 0.5 to 2.5% by weight of the caprolactone triol, 65 to 75% by weight of the neopentyl adipate ester diol and 0 to 3%, preferably 0.5 to 2%, by weight of the polypropylene oxide diol having a molecular weight of about 1000 together with a functionally effective amount of a catalyst therefor. This latter adhesive is particularly adopted for use in less stringent conditions such as in the production of laminated picture frames wherein a relatively flexible film is adhered to a rigid plastic substrate and wherein extreme temperature conditions are not encountered during use.

The polyurethane adhesive composition disclosed herein is prepared in a conventional manner in a dry inert atmosphere by the reaction of the polypropylene oxide diol (e.g. PPG-1025 from Union Carbide having a molecular weight of about 1000 and Poly G 20-265 from Olin Chemicals having an average molecular weight of about 425), neopentyl adipate ester diol having an average molecular weight of about 1000 (e.g. Ruccoflex S-107-110 from Ruco Polymer Corp.) and a caprolactone triol (a 2-oxepanone polymer with 2-ethyl-2-(hydroxymethyl-1,3 propanediol) having an average molecular weight of about 300 (e.g. Tone 0301 from Union Carbide) with an excess of the diphenylmethane diisocyante (e.g. Mondur M from Mobay) to form a branched polymer having a slight excess of free isocyanate groups. (All molecular weights are number average weights.) The reaction may be carried out in a dry solvent or solvent may be added at any point during the reaction to facilitate processing. Subsequently, the appropriate catalyst system is admixed with the resulting polymer.

Suitable catalysts for this reaction are well known in the art and include numerous organometallic compounds such as heavy metal carboxylates (e.g., dibutyl tin dilaurate, stannous octoate, lead octoate, mercuric succinate), as well as amines and the ferric complex of acetoacetic ester. Catalytic amounts of these materials are employed, generally ranging from 0.001 to 3 parts per 100 parts by weight of the polyurethane polymer, depending on the catalyst. Additionally, stabilizers such as ethyl acetoacetate, isophorone, as well as the dialkyl ($C_1$–$C_4$) malonates having i.e., di(lower alkyl) malonates such as dimethyl malonate, diethyl malonate, methyl-ethyl malonate, etc., are generally employed in an amount up to about 10% by weight. In accordance with the present invention, we have found dibutyl tin dilaurate to be the preferred catalyst when used at levels of 0.025 to 0.2%, preferably 0.12 to 0.2% by weight for plastic/wood lamination, with about 0.2 to 2.5%, preferably 1.2 to 1.9%, by weight diethyl malonate, and preferably 0.025 to 0.1% by weight catalyst for Mylar lamination, with about 0.1 to 0.8%, preferably 0.1 to 0.4%, by weight diethyl malonate.

The resulting polyurethane may be used directly in the solvented form in which it is produced or it may be further diluted with conventional solvents such as methyl ethyl ketone, methyl isobutyl ketone, 1,1,1 trichloroethane, methylene chloride, toluene, or the like, and preferably used at solids levels of 60 to 90% by weight.

The substrate employed in the laminate produced with the adhesive previously described can be chosen from a wide variety of materials such as particle board, hard board, fiber board, lauan plywood, styrofoam, rigid plastic such as polyvinyl chloride and the like. This rigid substrate serves as a base to which a thin, plastic sheet is laminated to give the composite structure and the desired appearance. The plastic is not restricted to any particular plastic but polyvinyl chloride sheet or Mylar film are the most commonly employed.

The plastic film generally has a thickness of about 1 to 55 mils, preferably 30 to 50 mils in the case of polyvinyl chloride, and 1 to 15 mils in the case of Mylar, and the substrate is generally at least about five times thicker than the plastic. The plastic is adhered to one or more surfaces of the substrate through the use of the specific adhesive disclosed herein.

In forming the laminates according to the present invention, the selected substrate is sanded and cleaned, if required, and the adhesive is coated on the substrate surface and dried. The plastic is then placed on the adhesive coated surface and lamination is effected at ambient temperature under pressure. Although not required, moderate heat may be used to further accelerate the curing process. Additionally, though not essential, a protective coating may be applied on top of the laminate by spreading a liquid polymeric resin on the plastic film surface and then converting the thermoplastic resin to a strong infusable, clear, colorless solid.

EXAMPLES

In order to prepare the urethane adhesive of the invention, the following procedure was utilized:

A clean and dry reactor was purged with nitrogen and initially charged with 113.7 parts diphenylmethane diisocyanate. The contents were heated to melt (between 120°-180° F.) whereupon 11.6 parts caprolactone triol were added with agitation, followed by the slow addition of 169.4 parts of neopentyl adipate ester diol over a period of 1 to 6 hours while the temperature was maintained between 120°-180° F. The temperature was lowered to 90°-120° F. and 45.3 parts methyl ethyl ketone added to reduce viscosity. Then 11.6 parts of polypropylene oxide diol (M.W.=425) were added followed by the addition of 27.1 parts polypropylene oxide diol (M.W.=1,000) over a period of about 2 hours. Processing was continued for an additional two hours to insure complete reaction. Thereafter, 4.8 parts diethyl malonate was then dissolved into the polymer solution followed by the addition of 0.5 parts dibutyl tin dilaurate. Additional solvent was added to assure a solids content of about 70%. The resultant adhesive was designated Adhesive 1.

Using a similar procedure, Adhesives 2–8 described in Table I were prepared. In Table I, the parts used in the exemplary procedure described above were revised to reflect a 100 part total. As a control, a commercially utilized polyurethane adhesive was prepared from 39.4 parts diphenylmethane diisocyanate, 59 parts polypropylene oxide diol (M.W.=760), 1.3 parts diethyl malonate and 0.3 parts dibutyl tin dilaurate.

TABLE I

| Ingredients (by weight) | 1 | 2 | 3 | 4 | 5 | 6 | 7 | 8 |
|---|---|---|---|---|---|---|---|---|
| Diphenylmethane Diisocyanate | 33.4 | 31.0 | 37.4 | 31.32 | 24.3 | 25.8 | 24.9 | 25.1 |
| Caprolactone triol | 3.34 | 3.0 | 3.7 | 3.1 | 0.5 | 2.1 | 0.5 | 1.5 |
| Neopentyl Adipate ester diol | 50.1 | 54.32 | 44.62 | 47.0 | 74.91 | 69.71 | 73.81 | 71.61 |
| Polypropylene diol (M.W. = 1000) | 8 | 7.0 | 8.9 | 7.5 | — | 2.1 | 0.5 | 1.5 |
| Polypropylene diol (M.W. = 425) | 3.34 | 3.0 | 3.7 | 9.4 | — | — | — | — |
| Diethyl Malonate | 1.66 | 1.5 | 1.5 | 1.5 | 0.23 | 0.23 | 0.23 | 0.28 |
| Dibutyltin Dilaurate | 0.16 | 0.18 | 0.18 | 0.18 | 0.06 | 0.06 | 0.06 | 0.06 |

TEST SAMPLE PREPARATION

A ⅜ inch particle board substrate was coated with the urethane adhesive to be tested. Thereafter, a 40 mil thick polyvinyl chloride film was laminated to the adhesive coated surface using a hand roller and the laminates were stacked and allowed to cure for the time indicated in Table II. The resulting laminates were then tested using the following testing procedures.

PEEL STRENGTH TEST PROCEDURE

4×1 inch segments of PVC laminated wood prepared as above were cut for use as test samples. The laminate was stripped back along the first square inch and a pair of locking pliers was gripped onto the laminate tab. A Hunter Force Gauge was attached to the locking pliers and with even hand pressure the laminate was peeled away from the wood at a 90° angle. The continuous peel strength was read directly from the gauge.

The laminates were allowed to cure overnight. One set of samples were then conditioned for 24 hours at room temperature, another set conditioned for 24 hours at 180° F., and another set soaked for 24 hours in 120° F. water. After conditioning, the samples were equilibrated for 2 hours at 72° F. and tested using the peel strength procedure described above. The results of the testing of Adhesives 1–4 are shown in Table III. The results are recorded as the average of two tests.

TABLE II

| | Peel Strength | | | |
|---|---|---|---|---|
| Conditioning | Adhesive 1 | Adhesive 2 | Adhesive 3 | Adhesive 4 |
| 24 hours @ room temp. | 22.5 pli | 7.6 pli | 10.5 pli | 7.85 pli |
| 24 hours @ 180° F. | 34.5 pli | 15.9 pli | 10.2 pli | 13.65 pli |
| 24 hours in 120° F. water | 19.9 pli | 9.45 pli | 11.5 pli | 11.0 pli |

Additionally, when laminates prepared as described above using Adhesive 1 were exposed to repeated cylical temperature changes varying between −20° and 180° F., the bonds withstood substantially more cycles than did the currently utilized commerical adhesive composition.

GREEN TENSILE STRENGTH

The adhesive was brush applied to 3×2″ rigid vinyl sheets which were oven dried for three minutes at 120°

F. to evaporate solvent. The adhesively coated vinyl sheets were left open to atmospheric exposure (50% RH @ 72° F.) for 0, 5, 10, 15, 20 and 30 minutes whereupon pine wood 2×2" squares were bonded to the vinyl such that ½" vinyl tabs overhung on two opposing edges of the wood square. The bonded assemblies were immediately placed into an Instron testing machine, gripping the wood and vinyl tabs. Assemblies were pulled apart in a tensile mode at a rate of 2 inches per minute.

The results of the testing of Adhesive 1 and the control are shown in Table III.

TABLE III

| Time | Control | Adhesive 1 |
| --- | --- | --- |
| @ 0 min. | 43 psf | 108 psf |
| @ 5 min. | 49 psf | 101 psf |
| @ 10 min. | 38 psf | 96 psf |
| @ 15 min. | 41 psf | 115 psf |
| @ 20 min. | 35 psf | 105 psf |
| @ 30 min. | 50 psf | 45 psf |

The results of Table III show the superior green strength of the product of the present invention as characterized by the high peel values obtained soon after coating of the samples. While Adhesive 1 had a shorter open time (as shown by its reduced peel strength at 30 mintes), this is not a detriment in commercial laminations where bonds are made rapidly after adhesive coating so that adhesive strength at these early stages is more important.

ASTM Rolling Ball Tack Test 3121 was also performed on samples bonded with Adhesive 1 and the control in order to determine the degree of tack. In this test, a steel ball is released at the top of an incline, allowed to accelerate down the incline and roll on to a horizontal surface covered with a pressure-sensitive adhesive. Tack is determined by measuring the distance that the ball travels across the adhesive before stopping. Shorter distances indicate higher tack. In this test, the control gave a value of 11.5 inches whereas Adhesive 1, representative of the invention, gave a value of 1.9 inches.

Furthermore, Adhesives 5–8 were tested on commercially used rigid polyvinyl chloride picture frame segments to which Mylar films were bonded. When subjected to conventional testing, the bonded laminates provided commercially acceptable results.

Various changes and modifications can be made in the process and products of this invention without departing from the spirit and scope thereof. The various embodiments set forth herein were for the purpose of further illustrating the invention but were not intended to limit it.

What is claimed is:

1. A solvented polyurethane adhesive composition comprising 20 to 40% by weight of diphenylmethane diisocyanate, 0.5 to 4.0% by weight of a caprolactone triol, 40 to 75% by weight of a neopentyl adipate ester diol, 0 to 10% by weight of at least one polypropylene oxide diol, and a functionally effective amount of a catalyst therefor.

2. The adhesive of claim 1 wherein the catalyst comprises 0.025 to 0.2% by weight dibutyl tin dilaurate and wherein there is additionally present 0.1 to 2.5% by weight of diethyl malonate.

3. The adhesive of claim 1 wherein the solvent is selected from the group consisting of methyl ethyl ketone, methyl isobutyl ketone, 1,1,1 trichloroethane, methylene chloride and toluene.

4. The adhesive of claim 1 wherein a polypropylene oxide diol component is present and comprises both a polypropylene oxide diol having a molecular weight of 425 and a polypropylene oxide diol having a molecular weight of 1000.

5. A solvented polyurethane adhesive composition specifically adapted for the lamination of plastic to wood substrates, the adhesive comprising 31 to 39% by weight diphenylmethane diisocyanate; 3.0 to 9.5% by weight of a polypropylene oxide diol having a molecular weight of about 1000; 3.0 to 9.5% by weight of a polypropylene oxide diol having a molecular weight of about 425; 44.5 to 54.5% by weight neopentyl adipate ester diol; 0.5 to 4% by weight of a caprolactone triol, and a functionally effective amount of a catalyst therefor.

6. The adhesive of claim 5 wherein the catalyst comprises 0.12 to 0.2% by weight dibutyl tin dilaurate and wherein there is additionally present 1.2 to 1.9% by weight diethyl malonate.

7. A solvented polyurethane adhesive composition specifically adapted for the lamination of Mylar film to rigid plastic substrates, the adhesive comprising 20 to 30% by weight diphenylmethane diisocyanate, 0.5 to 2.5% by weight caprolactone triol, 65 to 75% by weight neopentyl adipate ester diol and 0 to 3%, by weight of polypropylene oxide diol having a molecular weight of about 1000 together with a functionally effective amount of a catalyst therefor.

8. The adhesive of claim 7 wherein catalyst comprises 0.025 to 0.1% by weight dibutyl tin dilaurate and wherein there is additionally present 0.1 to 0.8% by weight of diethyl malonate.

9. The adhesive of claim 7 wherein the polypropylene oxide diol is present in an amount of 0.5 to 2% by weight.

* * * * *